UNITED STATES PATENT OFFICE 1,935,712

KETONE HYDRAZONES, AND PROCESS OF MAKING THE SAME

Ernst Herdieckerhoff, Opladen, and Fritz Ballauf, Elberfeld, Germany, assignors to General Aniline Works, Inc., New York, N. Y., a corporation of Delaware No Drawing. Application August 20, 1930, Serial No. 476,714, and in Germany March 2, 1928

8 Claims. (Cl. 260—129)

The present invention relates to a process of preparing ketone hydrazones of phenylhydrazine-sulfonic acids and to the new products obtainable thereby, more particularly it relates to compounds of the probable general formula:

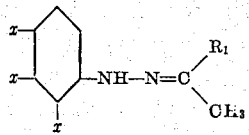

wherein one $x$ stands for a sulfonic acid group, the other $x$'s stand for hydrogen, $R_1$ stands for methyl or a radical of the benzene series, or $R_1$ and $-CH_3$ jointly stand for the n-pentamethylene radical.

When the o-, m- or p-phenylhydrazine-sulfonic acids are heated in aqueous solution or in a water miscible inert organic solvent, such as alcohol, with the about molecular quantity of acetone, acetophenone or a Bz-substitution product thereof and cyclohexanone, no reaction worth mentioning occurs. When the solution is rendered alkaline (to phenol-phthaleine), for example, with alkali hydroxide or sodium carbonate, then also formation of hydrazone does not occur.

Now we have found that the reaction with formation of hydrazone proceeds smoothly by neutralizing the alkaline solution of the phenyl-hydrazine-o-, -m- or -p-sulfonic acid by means of any desired acid, for example, dilute hydrochloric acid or sulfuric acid, until red litmus paper no longer shows any alkaline reaction, and this solution in admixture with the ketone is heated to temperatures between about 50 and 100° C.; then the reaction commences immediately, and the ketone present as an oil in the aqueous solution disappears. On cooling, the hydrazone separates in beautiful crystals in form of the alkali metal salt of the sulfonic acid. The same result is obtained by preparing an aqueous suspension of the phenylhydrazine-sulfonic acid, neutralizing slowly and carefully with an alkali until the point is reached at which the acid reaction has disappeared and red litmus is not yet colored blue, adding an about equimolecular amount of the ketone and heating to about 50–100° C. The reaction immediately commences and is soon complete. Instead of starting with the free phenylhydrazine-sulfonic acid and neutralizing the aqueous suspension thereof by the addition of alkali, there may of course be started with an alkali metal salt of phenylhydrazine-sulfonic acid, all methods referred to above falling within the scope of the invention. Instead of using the alkali metal compounds of the phenylhydrazine sulfonic acids, there may be worked with other water soluble salts, such as the magnesium salts.

Our new ketone hydrazones are in the form of their alkali metal salts generally colorless crystalline substances, easily soluble in water and are valuable intermediate products in the manufacture of dyestuffs.

The invention is illustrated by the following examples, without being limited thereto:

*Example 1.*—45 grams of phenylhydrazine-m-sulfonic acid (pure) are made into a suspension with 100 ccs. of water and heated with just sufficient caustic soda to produce alkaline reaction. The sulfonic acid is then dissolved as the sodium salt. 35–40 grams of acetophenone are added to this solution, which is then neutralized with thorough shaking by means of hydrochloric acid until the alkaline reaction to litmus just disappears. On heating the reaction of the phenyl-hydrazine-sulfonic acid with the acetophenone then takes place almost instantaneously. The solution is heated for several hours longer to 95° C. On cooling the hydrazone of the formula:

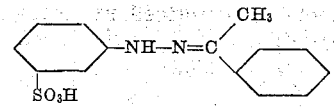

crystallizes out in satisfactory yield in the form of the sodium salt.

*Example 2.*—45 grams of phenylhydrazine-m-sulfonic acid are treated with 40–45 grams of p-methylacetophenone as described in Example 1. The ketone hydrazone of the formula:

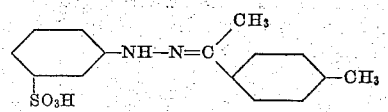

crystallizes out in the form of its sodium salt in beautiful needles in almost quantitative yield.

*Example 3.*—45 grams of phenylhydrazine-m- sulfonic acid are treated with 45 grams of p-chloroacetophenone as described in Example 1. The ketone hydrazone of the formula:

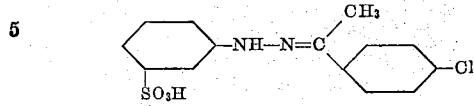

crystallizes out in the form of its sodium salt; the yield is likewise satisfactory.

*Example 4.*—40 grams of phenylhydrazine-m-sulfonic acid are treated with 15-20 grams of acetone as described in Example 1. As acetone has a lower boiling point than water the reaction can in this case be carried out at a lower temperature. On account of the solubility of the sodium salt of the desired hydrazone it is desirable to evaporate the solution somewhat when the reaction is complete. The hydrazone of the formula:

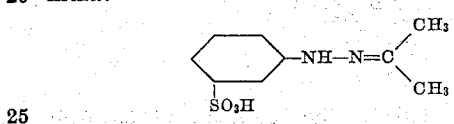

then crystallizes out in the form of its sodium salt with a satisfactory yield.

*Example 5.*—40 grams of phenylhydrazine-p-sulfonic acid are treated with 40 grams of p-chloroacetophenone as described in Example 1. On account of the comparatively greater solubility of the p-sulfonic acid derivatives it is desirable to add a little sodium chloride to the hot sodium hydrazone solution, when the reaction is complete. The ketone hydrazone of the formula:

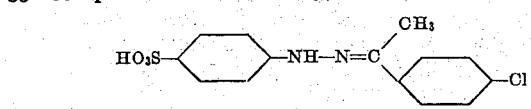

crystallizes in the form of its sodium salt. The yield is considerably improved; it amounts to about 80-90% of the theoretical.

*Example 6.*—40 grams of phenylhydrazine-p-sulfonic acid are treated with 20 grams of acetone as described in Example 4. The ketone hydrazone of the formula:

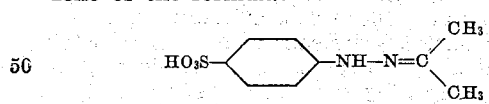

crystallizes out in the form of its sodium salt in beautiful needles.

*Example 7.*—45 grams of phenylhydrazine-o-sulfonic acid are treated with 35-40 grams of acetophenone as described in Example 1. The ketone hydrazone of the following formula:

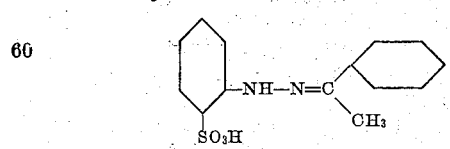

crystallizes out in the form of its sodium salt.

*Example 8.*—40 grams of phenylhydrazine-o-sulfonic acid are treated with 15 grams of acetone as described in Example 7. The ketone hydrazone of the following formula:

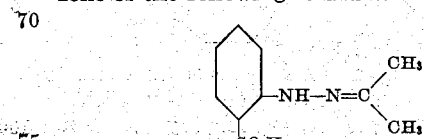

crystallizes out in the form of its sodium salt.

*Example 9.*—40 grams of phenylhydrazine-o-sulfonic acid are treated with 25 grams of cyclohexanone as described in Example 7.). The ketone hydrazone of the following formula:

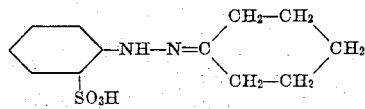

crystallizes out in the form of its sodium salt.

We claim:
1. The process which comprises heating about equimolecular proportions of a compound of the group consisting of alkali metal and magnesium salts of a phenylhydrazine -sulfonic acid and a ketone of the group consisting of acetone, acetophenone, Bz-chlorine- and -methyl-substitution products of acetophenone, and cyclohexanone, in aqueous solution neutrally reacting to litmus with the addition of a water-miscible, inert organic solvent, at a temperature between about 50° and about 100° C.

2. The process which comprises heating about equimolecular proportions of the sodium salt of phenylhydrazine-m-sulfonic acid and a ketone of the group consisting of acetone, acetophenone, Bz-chlorine- and -methyl-substitution products of acetophenone, and cyclohexanone, in aqueous solution neutrally reacting to litmus, at a temperature between about 50° and about 100° C.

3. The process which comprises heating about equimolecular proportions of the sodium salt of phenylhydrazine-m-sulfonic acid and acetophenone in aqueous solution neutrally reacting to litmus, at a temperature of 95° C.

4. Ketone hydrazones of the general formula:

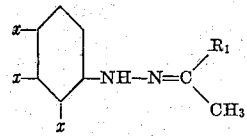

wherein one $x$ stands for a sulfonic acid group, the other $x$'s stand for hydrogen, $R_1$ stands for methyl or a radical of the benzene series, or -$R_1$ and -$CH_3$ jointly stand for the n-pentamethylene radical, being in the form of their alkali metal salts generally colorless crystalline substances, easily soluble in water and being valuable intermediate products in the manufacture of dyestuffs.

5. Ketone hydrazones of the general formula:

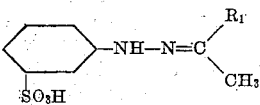

wherein $R_1$ stands for methyl or a radical of the benzene series, or -$R_1$ and -$CH_3$ jointly stand for the n-pentamethylene radical, being in the form of their alkali metal salts generally colorless crystalline substances, easily soluble in water and being valuable intermediate products in the manufacture of dyestuffs.

6. The ketone hydrazone of the following formula:

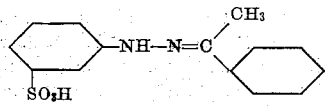

being in form of its sodium salt a colorless crystalline substance, easily soluble in water and being a valuable intermediate product in the manufacture of dyestuffs.

7. The ketone hydrazone of the following formula:

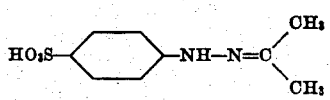

being in form of its sodium salt a colorless crystalline substance, easily soluble in water and being a valuable intermediate product in the manufacture of dyestuffs.

8. The ketone hydrazone of the following formula:

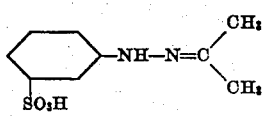

being in form of its sodium salt a colorless crystalline substance, easily soluble in water and being a valuable intermediate product in the manufacture of dyestuffs.

ERNST HERDIECKERHOFF.
FRITZ BALLAUF.